(No Model.)
2 Sheets—Sheet 1.

J. C. BEISANG.
DEVICE FOR REMOVING WASTE FROM SHEETS OF DOUGH IN CRACKER MACHINES, &c.

No. 530,499. Patented Dec. 11, 1894.

WITNESSES:
E. C. Carlsen
A. Reiss

INVENTOR:
Joseph C. Beisang.
By his Attorney
A. M. Carlsen (No Model.) 2 Sheets—Sheet 2.
J. C. BEISANG.
DEVICE FOR REMOVING WASTE FROM SHEETS OF DOUGH IN CRACKER MACHINES, &c.
No. 530,499. Patented Dec. 11, 1894.
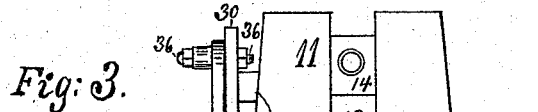
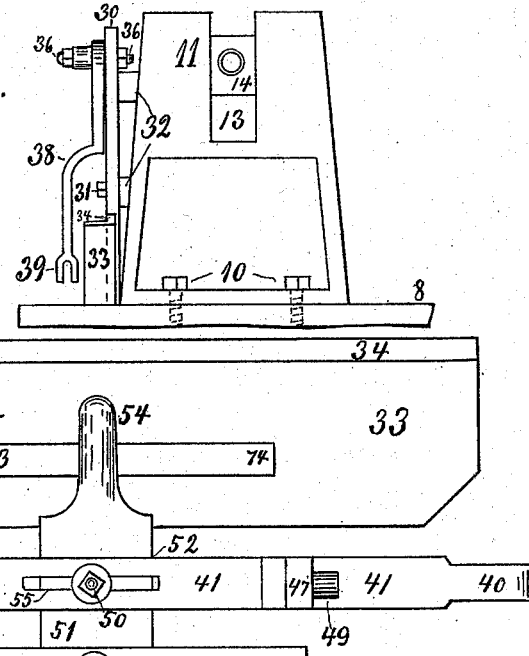
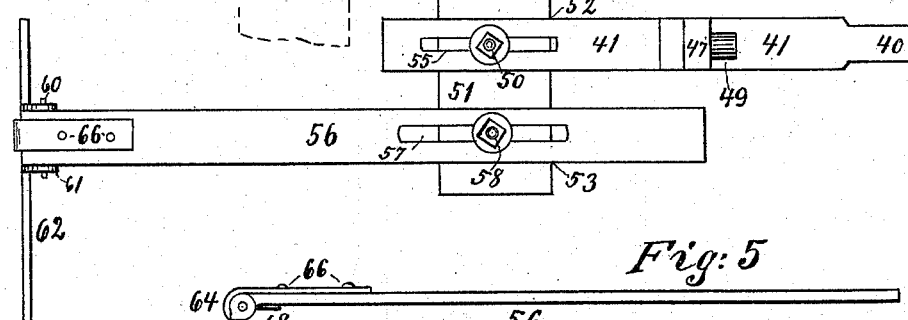
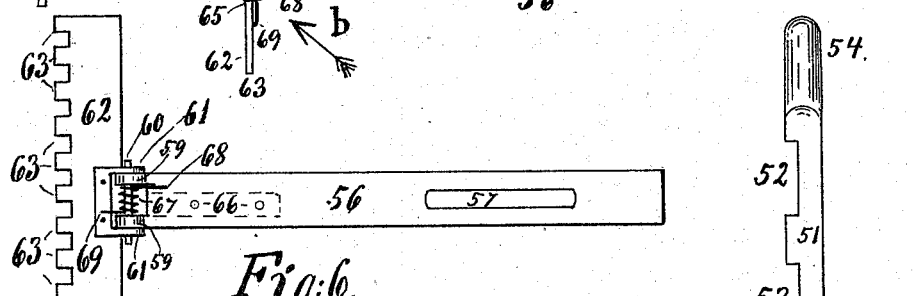
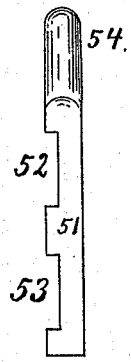
WITNESSES:
E. C. Carlsen
A. Pless
INVENTOR:
Joseph C. Beisang.
By his Attorney
A. M. Carlsen

UNITED STATES PATENT OFFICE.

JOSEPH C. BEISANG, OF ST. PAUL, MINNESOTA.

DEVICE FOR REMOVING WASTE FROM SHEETS OF DOUGH IN CRACKER-MACHINES, &c.

SPECIFICATION forming part of Letters Patent No. 530,499, dated December 11, 1894.

Application filed September 27, 1894. Serial No. 524,213. (No model.)

*To all whom it may concern:*

Be it known that I, JOSEPH C. BEISANG, a citizen of the United States, residing at St. Paul, in the county of Ramsey and State of Minnesota, have invented certain new and useful Improvements in Devices for Removing Waste from the Sheets of Dough in Cracker-Machines, &c.; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in machinery by which crackers, biscuits, snaps, wafers and the like forms of bread are formed or cut from a sheet of dough.

The main object of the invention is to provide the said class of machines with a mechanism that will automatically remove from the sheet of dough the waste or remnants of dough, which are loosened by the action of the cutter cutting the main or middle portion of the sheet into crackers or biscuits.

Heretofore in using such machines it has been necessary to keep a boy or other person on each side of the machine for removing the said waste edge of the dough or else such waste would crowd up in the machine and cause great bother to the person receiving the biscuit from the machine, and thus in the one way or the other cause a waste of labor and time, which is entirely avoided by the use of my mechanism, which is operated by the machine and removes automatically the said waste dough into receptacles.

Another object of my invention is to provide an automatic waste dough remover of such construction that it may readily be secured as an attachment to any ordinary machine used for the making of biscuits, crackers, &c.

With these objects in view my invention consists in the mechanism illustrated in the accompanying drawings, in which—

Figure 1:
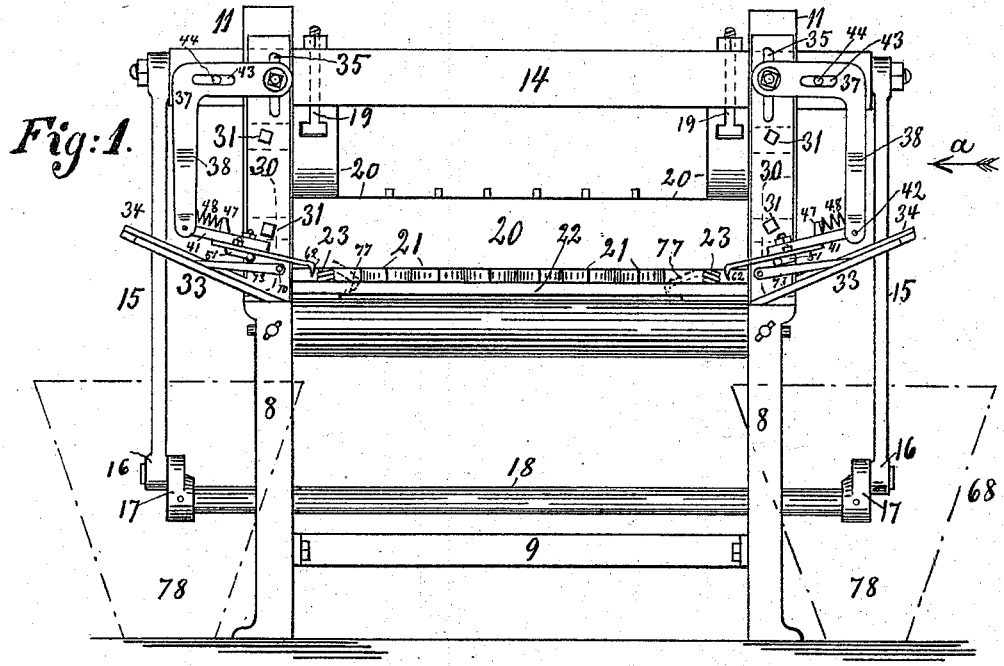
Figure 2:
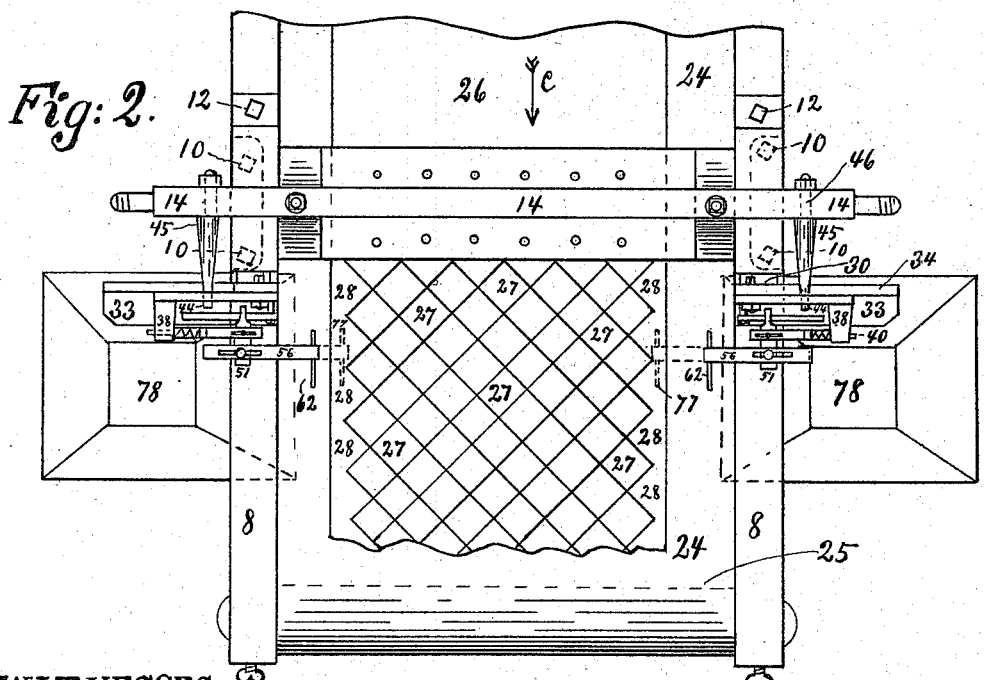

Figure 1, is an end elevation of a biscuit cutting machine having my attachments secured on it. It is viewed from the end that delivers the cut biscuits. Fig. 2, is a plan view of Fig. 1, with the rear portion of the machine cut away and the driving shaft, cranks, and pitmen removed. Fig. 3, is a side elevation of a portion of Fig. 1, viewed in the direction of the arrow, *a*. Fig. 4, is an enlarged detail plan view of my attachment with its operating lever removed. Fig. 5, is a side view of the rake, or portion of the attachment, by which the dough is raked away. Fig. 6, is an inverted or bottom view of Fig. 5, viewed in the direction of the arrow *b*. Fig. 7, is an edge view of the piece in Fig. 4, to which the rake is bolted.

Referring to the various parts in the drawings by reference numerals, 8, are the side frames, and legs of an ordinary biscuit cutting machine. These frames are secured together by braces as 9, and upon the frames are secured by the bolts 10, the brackets 11, (best shown in Fig. 3.) They may also be bolted as at 12, in Fig. 2. In the gaps or guiding notches 13, of the brackets 11, works up and down the cross-head 14, which is operated by the pitmen 15, of which the lower ends 16, are connected to the cranks 17, secured on both ends of the shaft 18, which is journaled in the lower parts of the side frames 8, and is either rocked or revolved by suitable parts (not shown) which receive motion from a belt driven by steam or other motive power.

To the cross-head 14, is removably secured by the bolts 19, the cutter 20, which is of old and well known construction, having the cutting dies 21, the stripper 22, and springs 23, &c.

24, is an endless apron or belt stretched over and operated by the roller 25, (shown in dotted lines in Fig. 2,) and a similar roller (not shown) journaled in the rear ends of the main frame.

26, is the sheet of dough resting upon and moving with the apron 24, in the direction of the arrow *c*, so as to pass under the cutter 20, and be cut into crackers or biscuits as 27.

When the machine is thus operated it will be seen in Fig. 2, that on each side of the sheet of dough there is formed a strip of remnant or waste dough 28, which in a great many instances must be removed and not allowed to move along with the portion 27, and it is for such removal of the shreds 28, that I employ the mechanisms or attachments which will now be described and which are so exactly alike for both sides of the machine that a description of one of them will suffice for both of them.

30, is an upright flat bar secured to the bracket 11, by the bolts 31, with intermediate blocks as 32, (shown in Fig. 3,) if the adjoining side of the bracket 11, is not plumb. The bar 30, is at its lower end provided with a rigid, flat, out and upwardly projecting arm or guide 33, having an upwardly projecting strengthening and guiding rib 34. This arm 33, and the bar or arm 30, may be considered as one bracket upon which I secure pivotally in the slot 35, a stud 36, upon which is pivotally secured the outwardly and downwardly extending lever 37, which is offset at 38, so as to make its lower and bifurcated end 39, register with the end 40, of the rod 41, to which it is pivoted by the pivot pin 42. In the lever 37, is provided a slot 43, in which engages the front end 44, of a stud 45, secured at 46 in the cross-head 14, so that when the cross-head is operated the lever swings on its stud 36, with its lower end moving substantially parallel with the guide 33.

The rod or arm 41, is provided with an upwardly projecting lug 47, between which and the lower part of the lever 37, is interposed a pushing coil spring 48, of which the ends are kept in place by studs like that shown at 49, in Fig. 4.

Adjustably secured by the bolt 50, to the rod 41, is a cross-bar 51, shown edgewise in Fig. 7, as having two notches 52, and 53, and a finger-shaped end 54; while the inner end of the rod 41, having the slot 55, is guidingly secured in the notch 52. The rake bar 56, having the slot 57, is likewise adjustably and guidingly secured in the notch 53, by the bolt 58. The inner end of the bar 56, is provided with two lips 59, which by means of the pin 60, is pivoted between the two lips 61, projecting from the blade 62, which is the rake proper by which the waste dough is removed, and it is for that purpose provided with the teeth 63, so as to readily take a firm hold of the dough.

The blade 62, is normally held in the position shown in Fig. 5, about, at right angle with the bar 56, by means of the stopping hook 64, touching the front side of the blade at 65, and being secured at 66, to the bar 56, and the twisting coil spring 67, encircling the pivot pin 60, and having its ends 68, and 69, pressing respectively against the inner sides of the bar 56, and the blade 62, so as to throw them apart and into the angular position to each other.

In the bracket bar 30, (best shown in Fig. 4,) I secure the stud 70, upon the front end of which I secure pivotally between the shoulder 71, and the nut or pin-fastened collar 72, a guide lever 73, of which the free and wedge-shaped end 74, is normally held down upon the bracket arm 33, by means of the stud 75, secured in the said lever 73, and the spring 76, secured in the stud 70, and pressing upon said stud 75.

In operation when the cross-head 14, is operated as usually in such machines the stud 45, by its end 44, engaging the slot 43, of the lever 37, causes the latter to swing on its pivot or stud 36, so that the rake reciprocates from the position shown in dotted lines at 77, in Figs. 1 and 2, to a position so far out that the waste dough will drop down into the receptacles 78, (which are in Fig. 1, shown only in outlines so as not to obstruct the view of other parts.) When the rake is pushed forward to take hold of the dough the finger 54, slides upon the guiding lever 73, and thus keeps the rake in a lifted position until the finger 54, drops down as at 79, in Fig. 5, when the rake engages the dough 28, and is at once pulled outward in the lowered position with the finger 54, passing under the lever 73, until the end 74, is lifted and passed and the dough 28, being raked out over the machine drops from the rake into the receptacles 78. The spring 48, tends at all times to throw the rake downward into the dough with accuracy and the spring 67, makes the blade of the rake yielding so that it can never push in the dough and squeeze the crackers, biscuits, &c., out of shape, but in passing inwardly upon the dough will yield to any obstruction and be a rigid rake only when drawn outward and is to perform its function.

From the above description it will be seen that I provide a biscuit cutting machine that will save the labor of two assistant operators and further that my improvement on the said class of machinery may readily be applied to mostly any make of such machines by simply providing the cross-head 14, with a couple of studs as 45, for engaging the slots 43, of the levers 37, and then secure the bracket bar 30, to the stands or brackets 11, of the machine with suitable filling as 32, of wood or iron if any such filling be needed between the said bracket 11, and bar 30.

Having thus described my invention, what I claim as new, and desire to secure by Letters Patent, is—

1. In a cutting machine for biscuits, cakes, crackers &c., the combination with the stands or brackets 11, and cross-head 14, moving up and down therein and carrying the cutter 20, and the endless belt moving the dough under said cutter of the attachment consisting of the bar or bracket 30, secured to the bracket 11, and having the angular lever 37 adjustably pivoted to the upper end of the bar 30, and being provided with the slots 43, the studs 45, secured in the cross-head and engaging the said slots 43, a raking device pivotally secured to the lower end of the lever 37, adapted to rake the waste or remnant strips away from the dough, and means for holding said rake elevated above the dough when moving in upon it, and to let the rake descend and engage the dough and travel in a lowered position while moving outwardly, substantially as shown and described and for the purpose set forth.

2. In an attachment for cutting machines for crackers, biscuits, cakes, &c., the combination of the upright arm or bar 30, adapted to be secured to the frame work of the cutting machine and having the slot 35, in its upper end and at its lower end the outwardly and upwardly projecting guiding arm 33, the guiding lever 73, pivoted with its inner end on a stud as 70, secured in the main bar 30, the spring 76, and stud 75, for holding the lever 73, with its free end, normally down upon the guiding arm 33, the lever 37, adjustably pivoted in the slot 35, and having the slot 43, the pin or stud 45, adapted to be secured in the cross-head of the machine, and engaging said slot 43, the finger 54, adapted to move guidingly forward upon the guide lever 73, and backward below it upon the guide arm 33, and having the body portion 51, with the notches 52, and 53, the slotted connecting rod 41, adjustably secured in the notch 52, and having its other end 40, pivoted to the lower end of the operating lever 37, the slotted rake bar 56, adjustably secured in the notch 53, the toothed rake blade 62, pivotally secured to the bar 56, the spring 67, stop 64, for holding the blade 62, normally in an angular position to the bar 56, and the spring 48, tending to hold the rake downward, substantially as shown and described, and for the purpose set forth.

In testimony whereof I affix my signature in presence of two witnesses.

JOSEPH C. BEISANG.

Witnesses:
PAUL SCHRAMM,
F. J. ROYER.